(12) United States Patent  (10) Patent No.: US 9,027,481 B2
Kister et al.  (45) Date of Patent: May 12, 2015

(54) DETONATING PYROTECHNIC RUPTURE PIECE

(75) Inventors: Thomas Kister, Vaux sur Seine (FR); Joël Astier, Merignac (FR); Sébastien Gigleux, Montesson (FR)

(73) Assignee: Astrium SAS, Suresnes (FR)

( * ) Notice: Subject to any disclaimer, the term of this patent is extended or adjusted under 35 U.S.C. 154(b) by 68 days.

(21) Appl. No.: 14/110,377

(22) PCT Filed: Mar. 29, 2012

(86) PCT No.: PCT/FR2012/050670
§ 371 (c)(1),
(2), (4) Date: Jan. 22, 2014

(87) PCT Pub. No.: WO2012/136918
PCT Pub. Date: Oct. 11, 2012

(65) Prior Publication Data
US 2014/0123867 A1  May 8, 2014

(30) Foreign Application Priority Data
Apr. 6, 2011 (FR) .................... 11 01040

(51) Int. Cl.
*F42B 15/38* (2006.01)
*B64G 1/64* (2006.01)

(52) U.S. Cl.
CPC ............... *B64G 1/645* (2013.01); *F42B 15/38* (2013.01)

(58) Field of Classification Search
CPC .......... B64C 1/32; B64G 1/645; F42B 15/36; F42B 15/38

USPC .............. 102/378, 377; 89/1.14; 244/122 AF, 244/122 AH
See application file for complete search history.

(56) References Cited

U.S. PATENT DOCUMENTS

| | | | | | |
|---|---|---|---|---|---|
| 3,362,290 A | * | 1/1968 | Carr et al. | ....................... | 89/1.14 |
| 3,486,410 A | * | 12/1969 | Lake et al. | ...................... | 89/1.14 |
| 3,698,281 A | * | 10/1972 | Brandt et al. | ................... | 89/1.14 |
| 4,685,376 A | * | 8/1987 | Noel et al. | ...................... | 89/1.14 |
| 5,109,749 A | * | 5/1992 | Olcer | ............................... | 89/1.14 |
| 5,129,306 A | * | 7/1992 | Fauvel | ............................ | 89/1.14 |
| 5,372,071 A | * | 12/1994 | Richards et al. | ............... | 102/378 |
| 5,392,684 A | * | 2/1995 | Renfro et al. | ................... | 89/1.14 |
| 5,585,596 A | | 12/1996 | Richards | | |
| 5,969,287 A | * | 10/1999 | Blain et al. | ..................... | 102/378 |
| 6,125,762 A | * | 10/2000 | Fritz et al. | ...................... | 102/378 |
| 6,170,400 B1 | * | 1/2001 | Salort | ............................ | 102/378 |
| 6,250,227 B1 | * | 6/2001 | Salort | ............................ | 102/378 |
| 6,286,430 B1 | * | 9/2001 | Salort | ............................ | 102/378 |
| 8,695,473 B2 | * | 4/2014 | Kametz et al. | ................. | 89/1.14 |
| 8,776,661 B2 | * | 7/2014 | Cousin | ............................ | 89/1.14 |
| 2006/0201316 A1 | * | 9/2006 | Kister | ............................ | 89/1.14 |
| 2012/0318125 A1 | * | 12/2012 | Cousin | ........................... | 89/1.14 |

FOREIGN PATENT DOCUMENTS

FR 2 861 691 5/2006

OTHER PUBLICATIONS

International Search Report dated Jul. 24, 2012.

* cited by examiner

*Primary Examiner* — Jonathan C Weber
(74) *Attorney, Agent, or Firm* — Dickinson Wright PLLC

(57) ABSTRACT

An expansion tube of a detonating pyrotechnic rupture piece is open next to pre-established rupture zones and, inside said open expansion tube there is disposed a sealed bladder which contains a pyrotechnic fuse.

7 Claims, 3 Drawing Sheets

DETONATING PYROTECHNIC RUPTURE PIECE

The present invention concerns a detonating pyrotechnic rupture part, particularly but not exclusively appropriate for use in space launch vehicles. It will be described below more specifically in this latest application.

It is known that some elements of space launch vehicles, such as adjacent stages, are connected to one another mechanically by a connection part intended to ensure the transmission of mechanical forces between said elements for as long as this is necessary and provided with detonating pyrotechnic separation means, incorporated into said part and able to break said part along a line of separation, when said elements must be separated from one another. Similar parts likewise allow the satellite carrier structures and protective shrouds on board launch vehicles to be cut.

U.S. Pat. No. 5,585,596 discloses a pyrotechnic rupture part of this type for rigidly connecting two elements, comprising:
  a profile comprising two at least approximately parallel wings, defining between them a groove closed on one hand by a bottom which is formed by said profile and which is connected to one of said elements, and on the other hand by the other of said elements, which is rigidly connected to said wings; and
    inside said groove:
      a pyrotechnic assembly which comprises a pyrotechnic fuse disposed in an expansion tube of flattened cross-section having at least approximately parallel lateral flanks and which is able to generate a detonation wave orthogonal to said lateral flanks; and
      a sealed bladder which can be inflated by the gases generated by firing said pyrotechnic assembly.

In this prior art document, the flattened expansion tube completely encloses the pyrotechnic fuse and has lateral orifices, the pyrotechnic assembly itself being enclosed in said bladder. The assembly formed by said bladder and by said pyrotechnic assembly is disposed in said groove such that the lateral flanks of the expansion tube are orthogonal to the wings of the profile. Furthermore, the portion of said element closing said groove is in the form of a piston for said groove and is rigidly connected to the wings of the profile by rivets passing orthogonally through said wings of the profile.

Thus, when the pyrotechnic fuse is fired, said elements are separated in two stages:
  first, the pyrotechnic assembly generates a detonation wave which is parallel to said wings of the profile and which shears said rivets;
  then, the gases generated by the pyrotechnic assembly inflate the bladder by passing through the orifices of the expansion tube, such that the bladder ejects said element from said groove.

A known pyrotechnic rupture part of this type is advantageous because, after shearing of the rivets, the bladder distances the two elements from one another. However, it has the drawback of requiring the use of rivets, which cannot withstand and transmit large mechanical forces between said elements connected by said part.

The object of the present invention is to overcome this drawback and to design a pyrotechnic rupture part which has a sealed bladder and which can be used to withstand and transmit large mechanical forces, as is vital between consecutive stages of space launch vehicles.

To this end, according to the invention, the pyrotechnic rupture part for rigidly connecting a first and a second element, said part comprising:
  a profile comprising two at least approximately parallel wings, defining between them a groove closed on one hand by a bottom which is formed by said profile and which is connected to one of said elements, and on the other hand by the other of said elements, which is rigidly connected to said wings; and
    inside said groove:
      a pyrotechnic assembly which comprises a pyrotechnic fuse disposed in an expansion tube of flattened cross-section having at least approximately parallel lateral flanks and which is able to generate a detonation wave orthogonal to said lateral flanks; and
      a sealed bladder which can be inflated by the gases generated by firing said pyrotechnic assembly,
is distinctive in that:
  said wings of the profile comprise pre-established rupture regions;
  said expansion tube is disposed in said groove such that its lateral flanks rest substantially against said wings of the profile;
  said expansion tube is open on the side of the pre-established rupture regions of the wings of the profile; and
  said sealed bladder is disposed inside said open expansion tube and encloses said pyrotechnic fuse.

Consequently, when the pyrotechnic fuse is fired, the pyrotechnic assembly generates a detonation wave orthogonal (and no longer parallel) to said wings of said profile, such that said open expansion tube stretches transversely, distancing said wings of the profile from one another and causing them to break at said pre-established rupture regions, which are provided to ensure satisfactory mechanical strength between said first and second elements. Then, said bladder opens out under the effect of the gases from said pyrotechnic fuse and generates a separation pulse which it transmits through the opening of said expansion tube.

Thus, in the detonating pyrotechnic rupture part according to the present invention, the mechanical strength between said first and second elements is ensured, in an otherwise known manner, by said pre-established rupture regions which can withstand and transmit large mechanical forces and not by rivets, which have only low mechanical resistance to shearing.

Although they can be disposed at various points in said wings of the profile, it is advantageous for said pre-established rupture regions to be located in the vicinity of the connection between said wings and said bottom of the groove.

Preferably, in order to have a wide opening to said bladder, said open expansion tube has a U-shaped cross-section.

In order to set the distance between said pyrotechnic fuse and said pre-established rupture regions of said wings of the profile, the sealed bladder can enclose spacers which force said pyrotechnic fuse to assume a pre-determined position in said bladder and in said expansion tube. Furthermore, in order to protect said bladder from deterioration which could be caused by said pyrotechnic fuse when it is fired, said bladder encloses lateral protective screens between itself and said pyrotechnic fuse.

Furthermore, in order to increase the intensity of the separation pulse exerted by said bladder on said first element, it is advantageous for a rod of convex cross-section projecting towards said expansion tube to be provided opposite the opening of said expansion tube. Thus, the bladder only comes into contact with a limited surface of said first element. Before said pyrotechnic fuse is fired, it is preferable for efficiency reasons for said sealed bladder to assume the shape of the inside of said open expansion tube and that of said projecting rod.

The figures of the appended drawings will give a good understanding of how the invention can be implemented. In these figures, identical reference numerals denote similar elements.

Figure 1:
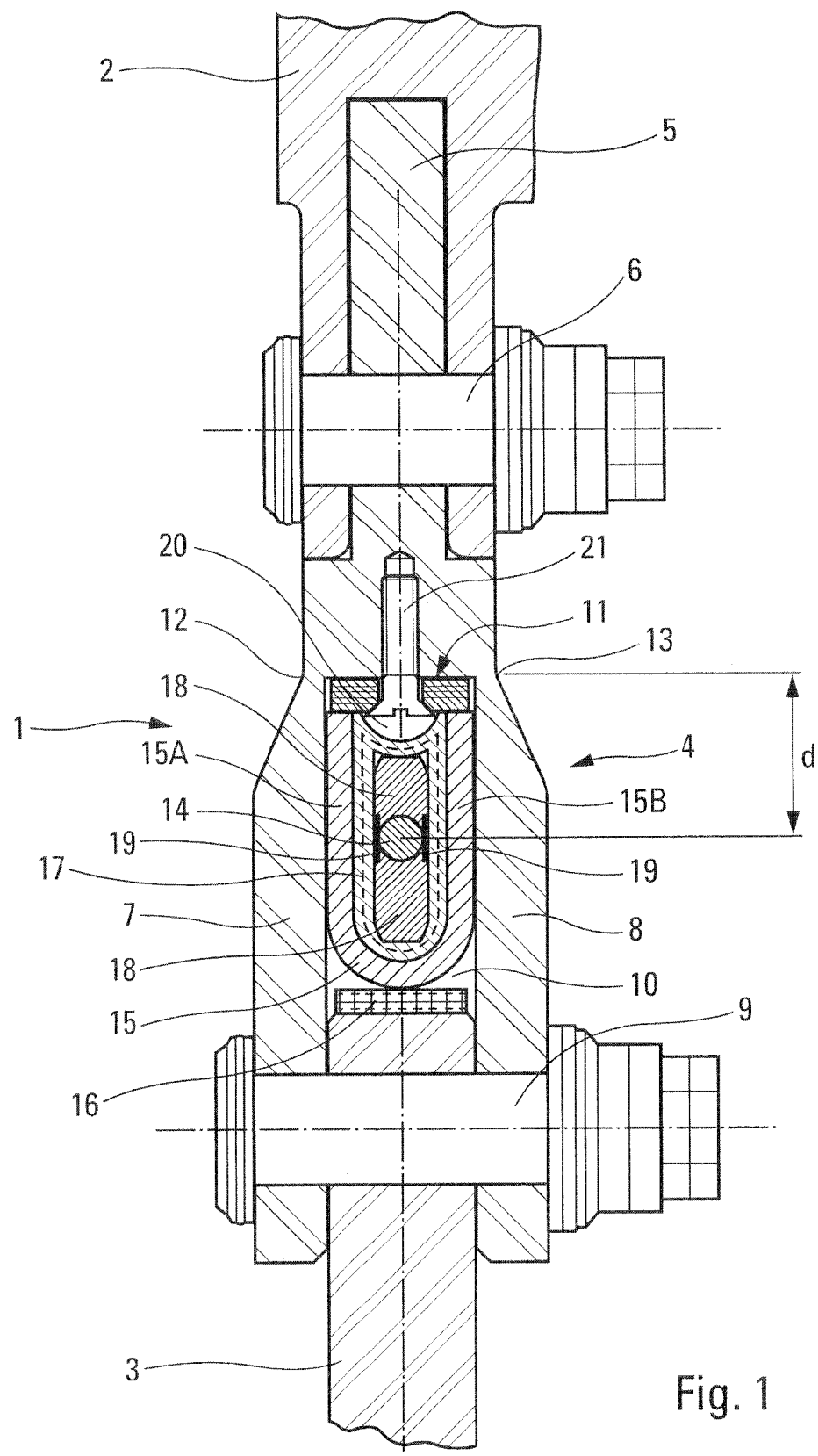
FIG. 1 is a cross-sectional view of a pyrotechnic rupture part according to the present invention, said part ensuring the transmission of forces between two mechanical elements, for example consecutive stages of a space launch vehicle.
Figure 2:
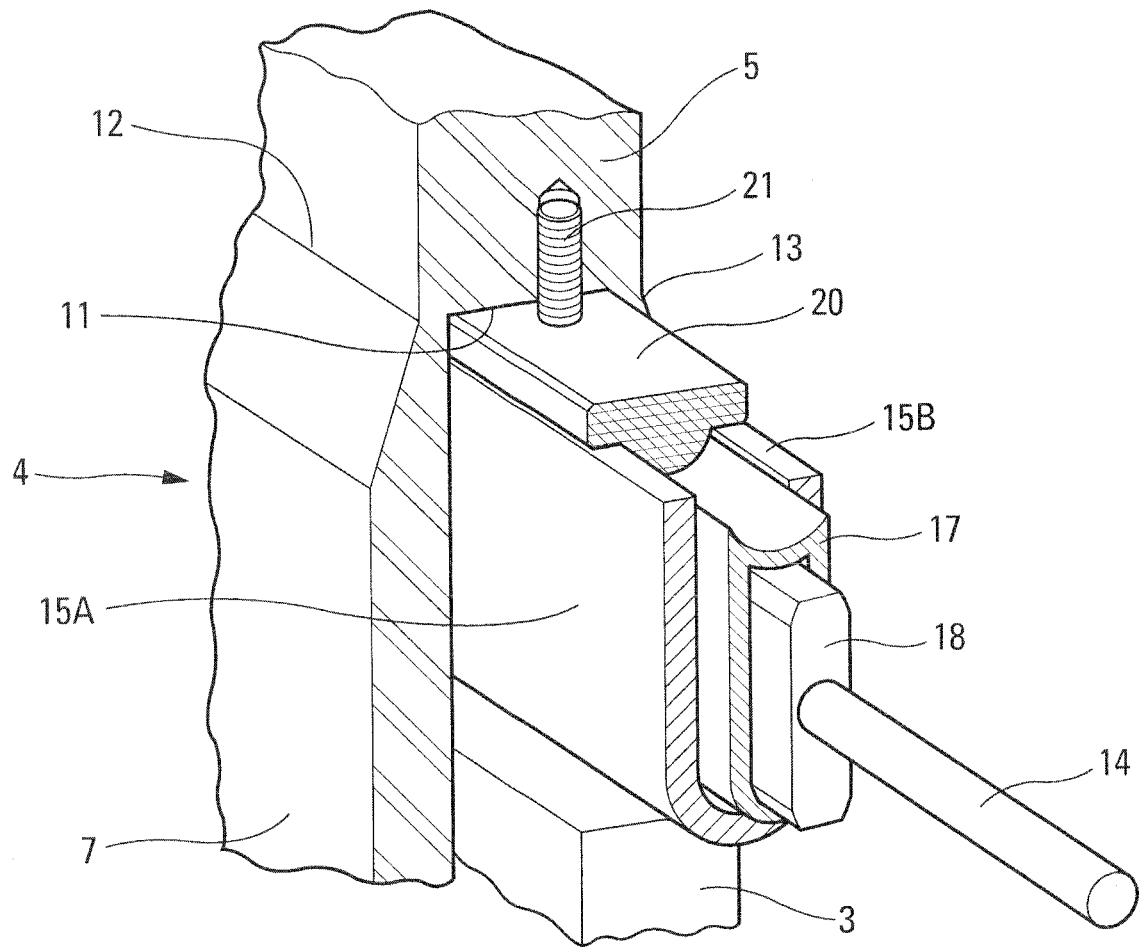
FIG. 2 is a partial schematic perspective view, with cut away, of the pyrotechnic rupture part from FIG. 1.

The pyrotechnic rupture part 1 according to the present invention and shown in these figures ensures the mechanical strength between two elements 2 and 3, for example consecutive stages of a space launch vehicle.

The pyrotechnic rupture part 1 comprises a profile 4 which is provided on one hand with a heel 5 used to rigidly connect said profile 4 to the element 2 by means of bolts 6, and on the other hand with two wings 7 and 8 used to rigidly connect said profile 4 to the element 3 by means of bolts 9.

The two wings 7 and 8 are at least approximately parallel and they define between them a groove 10 which is closed, on the side of the element 2, by a bottom 11 formed at the connection of the heel 5 and the wings 7 and 8 and, on the side of the element 3, by this element 3 itself.

In addition, at said connection of the heel 5 and the wings 7 and 8, these comprise pre-established rupture regions 12 and 13, formed for example by regions of reduced thickness.

Disposed inside the groove 10 is a pyrotechnic assembly which comprises a pyrotechnic fuse 14 and an expansion tube 15.

The expansion tube 15 has a U-shaped cross-section and is open towards the pre-established rupture regions 12 and 13. The lateral flanks 15A, 15B of the expansion tube 15 rest substantially against the wings 7 and 8 and a block 16 holds said tube orthogonal to said wings.

The pyrotechnic fuse 14 is enclosed in a sealed bladder 17, which is itself disposed in the expansion tube 15. Disposed inside the sealed bladder 17 are:

spacers 18 for setting the distance d between the pyrotechnic fuse 14 and the pre-established rupture regions 12, 13, and lateral screens 19 disposed between said pyrotechnic fuse 14 and the sealed bladder 17 in order to protect said bladder and prevent the deterioration thereof when said pyrotechnic fuse 14 is fired.

Opposite the opening of the expansion tube 15, a rod 20 of convex cross-section is fixed to the bottom 11 of the groove 10 by means of screws 21. The rod projects towards the expansion tube 15 and the sealed bladder 17 and said bladder assumes the shape of the inside of the expansion tube 15 and the shape of the projecting rod 20.

Figure 3:
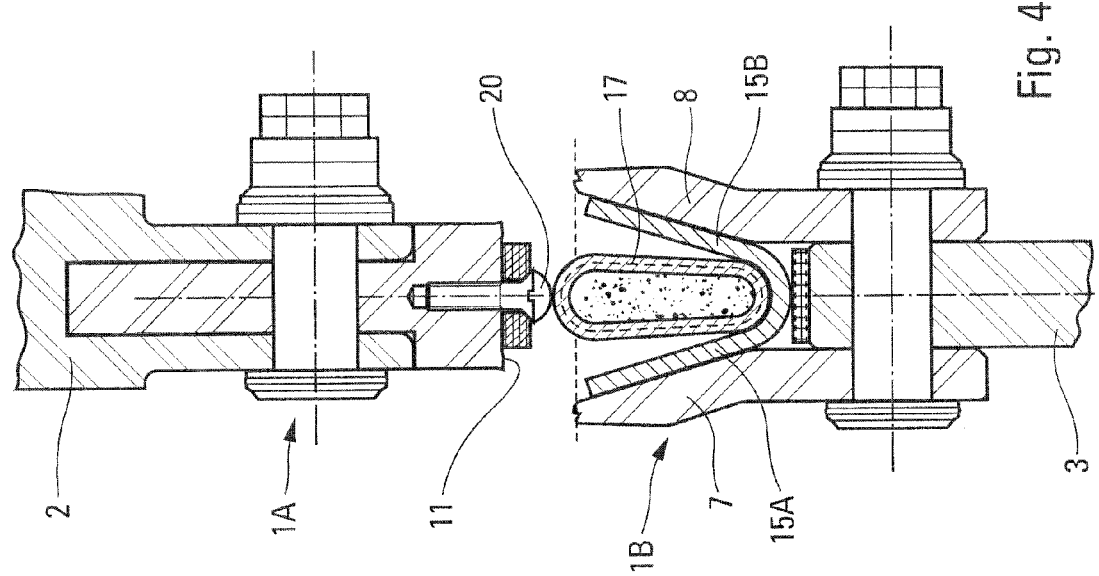
FIGS. 3 and 4 show, in views similar to FIG. 1, two successive steps of rupture and separation of the pyrotechnic rupture part according to the present invention.

When the pyrotechnic fuse 14 is fired, the high-speed detonation wave (several thousand m/s) generated by the pyrotechnic assembly 14, 15 orthogonal to the wings 7 and 8 causes the cutting of the pre-established rupture regions 12 and 13 and the spreading of the lateral flanks 15A, 15B of the expansion tube 15 and said wings 7 and 8 (FIG. 3). The cutting energy used is increased by the fact that the expansion tube 15 is open, and therefore there are no peripheral internal stresses therein. The part is actually out into two portions 1A and 1B in a few tens of microseconds, while the bladder 17 inflates with the gases generated by the pyrotechnic fuse 14 and by the volatisation of the spacers 18 and the screens 19.

In a first stage shown in FIG. 3, the bladder 17 naturally tends to adapt to the spreading of the flanks 15A, 15B of the expansion tube 15, while being supported on the rod 20.

Figure 4:
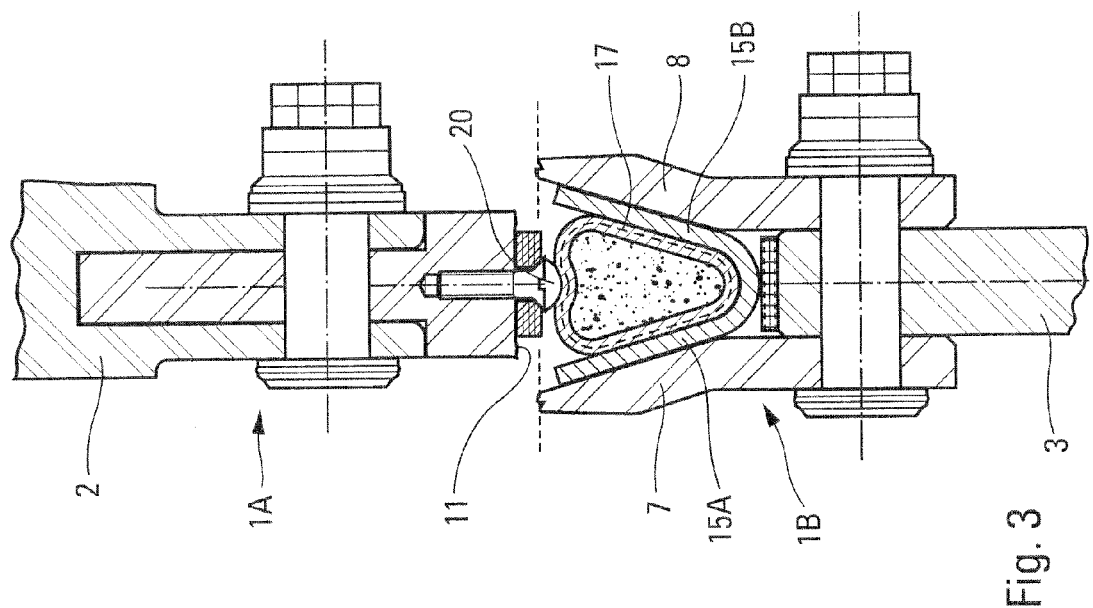

In a second stage shown in FIG. 4, the bladder 17 opens out towards the bottom 11 and generates the dynamic ejection pulse applied to the rod 20, making it possible to separate the out portions 1A and 1B of the part 1 (and thus the elements 2 and 3 which are rigidly connected thereto).

The invention claimed is:

1. Pyrotechnic rupture part for rigidly connecting a first and a second element, said part comprising:
    a profile comprising two at least approximately parallel wings defining between them a groove closed on one hand by a bottom which is formed by said profile and which is connected to the first of said elements, and on the other hand by the second of said elements, which is rigidly connected to said wings; and
    inside said groove:
        a pyrotechnic assembly which comprises a pyrotechnic fuse disposed in an expansion tube of flattened cross-section having lateral flanks; and
        a sealed bladder which can be inflated by the gases generated by firing said pyrotechnic assembly,
    wherein:
        said wings of the profile comprise pre-established rupture regions;
        said expansion tube is disposed in said groove such that its lateral flanks rest substantially against said wings of the profile;
        said expansion tube is open on the side of the pre-established rupture regions of the wings of the profile; and
        said sealed bladder is disposed inside said open expansion tube and encloses said pyrotechnic fuse.

2. Pyrotechnic rupture part according to claim 1, wherein said pre-established rupture regions are located in the vicinity of the connection between said wings and said bottom of the groove.

3. Pyrotechnic rupture part according to claim 1, wherein said open expansion tube has a U-shaped cross-section.

4. Pyrotechnic rupture part according to claim 1, wherein said sealed bladder encloses at least one spacer for setting the distance between said pyrotechnic fuse and said pre-established rupture regions of said wings of the profile.

5. Pyrotechnic rupture part according to claim 1, wherein said sealed bladder encloses lateral protective screens disposed between said pyrotechnic fuse and said sealed bladder.

6. Pyrotechnic rupture part according to claim 1, wherein opposite the opening of said expansion tube is provided a rod of convex cross-section projecting towards said expansion tube.

7. Pyrotechnic rupture part according to claim 6, wherein said sealed bladder assumes the shape of the inside of said open expansion tube and that of said projecting rod.

* * * * *